United States Patent [19]

Vogt

[11] Patent Number: 4,840,688
[45] Date of Patent: Jun. 20, 1989

[54] METHOD FOR THE PRODUCTION OF FIBROUS PLASTER BOARDS

[75] Inventor: Winold Vogt, Rothenburg, Fed. Rep. of Germany

[73] Assignee: Pfleiderer Industrie GmbH & Co., KG, Neumarkt, Fed. Rep. of Germany

[21] Appl. No.: 239,883

[22] Filed: Sep. 1, 1988

[30] Foreign Application Priority Data

Sep. 11, 1987 [DE] Fed. Rep. of Germany ....... 3730585
Aug. 13, 1988 [EP] European Pat. Off. ........ 88113212.0

[51] Int. Cl.⁴ ............................................. B32B 13/02
[52] U.S. Cl. ..................................... 156/39; 106/110; 156/45; 264/87
[58] Field of Search ............................ 156/39, 42, 45; 428/703; 106/110, 115, 109; 264/87, 333

[56] References Cited

U.S. PATENT DOCUMENTS

| | | | |
|---|---|---|---|
| 3,311,516 | 3/1967 | Jaunarajs et al. | 106/110 X |
| 4,148,781 | 4/1979 | Narukawa et al. | 156/42 X |
| 4,213,931 | 7/1980 | Trutnev et al. | 106/109 X |
| 4,239,716 | 12/1980 | Ishida et al. | 106/110 X |
| 4,502,901 | 3/1985 | Burkard | 156/39 |
| 4,734,163 | 3/1988 | Eberhardt et al. | 264/82 X |

FOREIGN PATENT DOCUMENTS 2649300 5/1978 Fed. Rep. of Germany.
2816466 10/1979 Fed. Rep. of Germany.

Primary Examiner—Michael W. Ball
Assistant Examiner—David W. Herb
Attorney, Agent, or Firm—Jordan and Hamburg

[57] ABSTRACT

A method for the production of fibrous plaster boards for which a suspension is prepared from wet-digested fiber material and calcium sulfate dihydrate, the suspension is formed into a board with removal of water, and the dihydrate is recrystallized with heating at atmospheric pressure to a hemihydrate which is subsequently converted back into the dihydrate by the addition of water. For this purpose, the suspension is dewatered from a water content of about 300 to 600% to one of about 30 to 40% in dewatering equipment, the dihydrate is recrystallized in air and without pressure to the beta form of the hemihydrate and the water, required for setting, is aspirated through the board by suction.

8 Claims, 1 Drawing Sheet

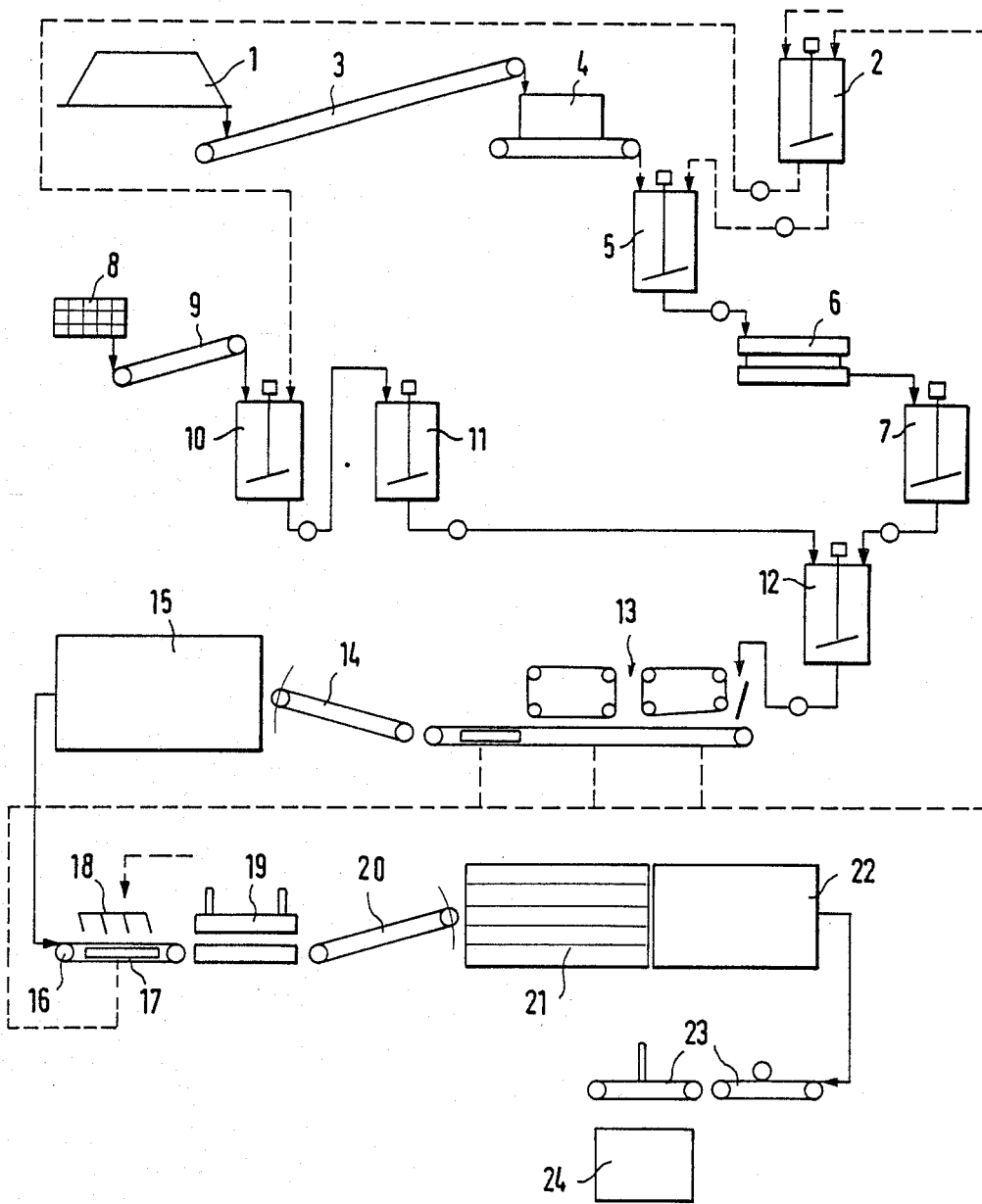

METHOD FOR THE PRODUCTION OF FIBROUS PLASTER BOARDS

The invention is directed to a method for the production of fibrous plaster boards, for which a suspension is prepared from wet-digested fiber material and calcium sulfate dihydrate, this suspension is formed into a board with removal of water, the dihydrate is recrystallized with heating to the hemihydrate and subsequently converted into the dihydrate.

BACKGROUND OF THE INVENTION

Fibrous plaster boards are board-shaped structures, which comprise a mixture of gypsum and fibers, the proportion of gypsum predominating and usually amounting to 80 to 90% and the fibers usually comprising paper fibers.

Methods are known for the production of such fibrous plaster boards, in which the gypsum is first of all calcined dry, that is, converted from the dihydrate into the beta hemihydrate. The hemihydrate is exclusively mixed either with dry or wet-refined fibers and the water required for hydration is added.

It has been ascertained that fibrous plaster boards, produced with wet digested paper fibers in the form of pulps, have 10 to 50% higher transverse bending strengths than do boards produced with fibers pulped by a dry process. Moreover, the fibers are dispersed more homogeneously in the core of the board and the appearance as well as the ease of working such panels is better. For shaping such boards, a suspension of calcined gypsum, that is, the hemihydrate, a pure paper pulp with a very high water content of about 300 to 600% is required. Such boards can be shaped only by the removal of a large proportion of the water. For this purpose, screening drums (coil method) and/or screen belts are used. With this wet method, however, it has turned out that the screen surfaces rapidly becomes contaminated by the setting gypsum, so that the expense of cleaning is appreciable and the operation is susceptible to breakdowns. To avoid these disadvantages of the wet method, methods have been proposed, for which the structures are shaped from the dihydrate.

For example, the German Offenlegungsschrift No. 2,649,300 proposes that a suspension of calcium sulfate dihydrate and fibers be shaped and dried by removal of water. This method does not utilize the hydraulic bonding properties of the gypsum, which are due to the repeated recrystallization into the hemihydrate and back into the dihydrate. For this reason, an adequate board quality cannot be achieved with this method without the addition of binders.

German Pat. No. 2,818,169 describes a method for the production of molded articles from gypsum. This method works with natural gypsum and without fibers. Only a small amount of water—5—10% of the natural gypsum—is added and high pressures of 6 Mpa are employed for the shaping. The method is intended for the production of low-pore plaster products. This method, however, is technically unsuitable for the production of fiber-containing structures of plaster and wet fibers, because wet-digested paper fibers cannot be mixed with gypsum rock in the amount of 10 to 20% required for fibrous plaster boards in such a way, that the water content in the molded article is low enough, that is, between 5 and 10%. Shaping by pressing, especially with correspondingly high pressure of 6 Mpa, is also excluded.

In the German Offenlegungsschrift No. 2,816,466, it is proposed that a board be shaped by removal of water from a suspension of dihydrate and pulp and heated under a pressure of 1.5 to 10 bar to temperatures of 115° to 180° C. Under these conditions, the conversion of the dihydrate to the alpha hemihydrate takes place. Subsequently, the molded article must be cooled, pressed under pressure and stored for about 2 hours to 7 days under humid room conditions and then dried. Because these storage times are too long for an industrial manufacturing process and therefore uneconomic, the German Pat. No. 3,419,558 proposes that the pH of the gypsum-fiber suspension be adjusted to a value of less than 7; after that and after the treatment of the board for 3 to 50 minutes in a saturated atmosphere, this conversion of the dihydrate to the alpha hemihydrate, that is in a pressure vessel, is said to shorten the setting time significantly. In actual fact, however, it has been ascertained that even the change in the pH has not significantly reduced the setting time; it still is about 1 to 3 days. It seems obvious to assume that, due to the wet treatment of the boards at temperatures between 100° and 160° C., materials are released from the paper fibers, which have a retarding effect on the setting reaction. Admittedly, due to the exchange of water in the dehydrated board, it was possible to reduce the setting time further to about 9 to 12 hours; however, this is still too long for an economic manufacturing process.

SUMMARY OF THE INVENTION

Because of the difficulties of the aforementioned methods, which arise out of the combination of the wet shaping of the boards from a suspension of dihydrate and wet-digested fibers, as well as the wet recrystallization of these boards to the alpha hemihydrate, it is an object of the invention to arrive at improved results by a new combination of the wet shaping process with the dry recrystallization of the boards to the hemihydrate.

To this end, the invention sees to it that, at first, a suspension of gypsum rock and wet-pulped fibers, with a water content of about 300 to 600%, is dewatered mechanically, as far as possibly, that is, to a residual moisture content of 30 to 40%, using suitable equipment such as a take-up roller or a fourdrinier and, at the same time, is shaped into boards, that the dihydrate recrystallizes in the atmosphere without pressure to the beta form of the hemihydrate and that the water required for the setting reaction is aspirated through the boards. To prepare the gypsum suspension, gypsum rock, as well as chemically precipitated gypsum, such as flue gas desulfurization gypsum or phosphoric acid gypsum can be used. The latter are particularly suitable because of their better dewatering properties and are particularly economic, because they are obtained with a high moisture content. The boards, obtained by the recrystallization to the beta hemihydrate, is almost completely dry. It is of particular advantage that the recrystallization takes place at atmospheric pressure and in the open atmosphere. The unfinished board, resulting from the dewatering, already has much stability, which is achieved due to the coherence of the wet fibers and the shaping with much water. The inventive method does not require any pressure to shape the panels; if necessary, especially if higher board densities are wanted, low pressures of the order of 0.05 to 0.1 Mpa can be applied. These can be used, at the same time, to smoothen the surface, to calibrate the boards and for additional dewatering.

The dry calcining of the crude boards takes place at board temperatures of between 100° and 170° C. and preferably of between 115° and 140° C. In this connection, the rate of temperature increase during the heating phase is completely immaterial. For the sake of rapid calcining, it should be more than 2° C./minute. Surprisingly. dry calcining does not result in damage to the paper fibers or a loss in board strength. On the contrary, the calcined board have an appreciable natural stability with, at the same time, a high elasticity, so that their transport, for example on roller conveyers presents no problems. The combination of wet shaping with dry calcining even has the advantage that a pure fiber filter layer, which protects the calcining equipment against contamination through plaster abrasion, is formed on the board surface during wet shaping.

A further step of the process consists of the introduction of the water required for setting into the core of the board by means of aspiration. Spraying, immersing or saturating with water vapor, on the other hand, has proven to be inefficient because, although the dry matter initially absorbs water eagerly, the fibers then become swollen and water cannot penetrate deeply enough into the core of the board. It is therefore within the scope of the invention to carry out the method in such a way, that the boards, when the water is aspirated through them, are flooded with a stocihiometric excess. It is advantageous if the water excess amounts to at least 2.5 times and, better yet, 3 to 4 times the stoichiometric amount required. The water, aspirated through the board, fills the hollow spaces with water. Through the aspirating effect, the water rapidly reaches the core and the underside of the board. Surprisingly, it has been ascertained that the aspiration times vary between 30 and 60 seconds depending on the thickness and density of the boards. They are thus significantly shorter than with the alpha method, because the dry board has a larger pore volume and water does not have to be exchanged. The excess of water furthermore ensures that, in the event of permeability differences, the board is completely impregnated with water at all places. Complete impregnation with sufficient water is a prerequisite for a uniform, complete crystalline conversion. The setting times are surprisingly short. They amount to 1.5 to 2 hours without the addition of accelerators. With that, and contrary to the previously known methods, the inventive method becomes economically feasible. Finally, a press is disposed downstream from the aspiration step. This ensures further averaging of the impregnation, further consolidation of the boards, additional dewatering and calibration. Press times of 30 to 60 seconds increase the board density, for example by about 10%.

Compared to the state of the art, which calcines under saturated steam and works with the alpha form of the hemihydrate, considerable advantages are thus achieved. The use of saturated steam was intended to avoid drying out of the formed boards and to retain at least that amount of water in the board, which is required for the subsequent rehydration of the hemihydrate to the dihydrate. To this must be added the energy point of view—the water required for rehydration, should not first have to be evaporated, since the heat of evaporation of water is exceptionally high. However, these expectations remained largely unfulfilled. On lowering the pressure after the treatment with saturated steam, it is difficult to prevent the water remaining in the panel escaping by evaporation. As a result, the panel is dried excessively, so that the water, finally remaining, frequently is inadequate for the recrystallization. During the heat treatment, the water remaining in the board has taken up impurities from the fibers. These impurities retard the setting process of the gypsum to such an extent, that this method consequently can hardly be carried out economically. Moreover, because of the discontinuous mode of operation of this method, the autoclave is cooled down after each heat treatment. The heat stored by the autoclave is thus lost. Finally, it was hoped to improve the strength of the boards by the use of alpha gypsum. It was assumed that the alpha hemihydrate, formed on calcining the alpha gypsum in an atmosphere of saturated steam, would result in a higher strength on setting than that achieved with the beta hemihydrate, which is formed on calcining in air. This expectation was also not fulfilled. The strength of the boards did not reach those values, which had initially been expected.

BRIEF DESCRIPTION OF THE DRAWINGS

Further characteristics, details and advantages of the invention arise out of the following description taken in conjunction with the accompanying drawing, which illustrates a schematized flow sheet of an installation for carrying out the method.

DESCRIPTION OF THE PREFERRED EMODIMENTS

The installation is based on the use of REA gypsum from a stockpile 1, which originated from a desulfurization installation. The starting material is supplied from the stockpile 1 over a conveyer 3 and a metering device 4 to a vessel 5, in which the gypsum is suspended in water from an industrial water tank 2. All or a part of the gypsum suspension is finely ground in a mill 6, for example in a rod mill or the like, to the desired particle size. This may correspond, for example, to a Blaine number of 1.000 to 3.500, which corresponds to a conventional, customary degree of fineness. From the comminuting equipment 6, the finely ground material reaches silo 7.

Parallel to this, used paper is taken from a stockpile 8 and supplied over conveyer 9 to digester 10, to which water from the industrial water tank 2 is added at the same time. The used paper is digested into its fibers. Of course, other conventional fibers of vegetable or mineral origin may take the place of the used paper. This would not represent a basic change in the method.

The pulp of fiber material and water, formed in the digester 10, is conveyed to the storage tank 11 and from there, just as the finely ground gypsum from silo 7, to the mixer 12. The mixture of fibers and gypsum corresponds to a ratio, which meets the particular requirements. The ratio, for example, is of the order of 1:10.

From mixer 12, the mixture is supplied for shaping and simultaneous dewatering to equipment 13, which is equipped, for example, as a fourdrinier with dewatering screen belts circulating top and bottom. The boards, shaped between the screen belts, then pass over multilayer feeder 14 into a continuous furnace 15, in which a drying process takes place in a first step of the process. This takes about 15 to 25 minutes. It is then followed by a second step of the process in the form of a calcining step, for which also a time of 15 to 25 minutes is fixed. The circulating air, which is under atmospheric pressure, serves as the treatment medium. The air temperature in the first half of the continuous furnace 15 is about 150° to 300° C.; in the second half, on the other hand, it is about 170° to 190° C. With that, the air moisture is clearly below the saturation value and has a value, for example, of about 0.1 to 0.3 kg of water per kg of air. The shaped boards run at ambient temperature (for example, about 20° C.) into the continuous furnace 15. There, for the first segment of the process, the temperature of the boards increases to about 100° C. due to contact with the hot air. By these means, however, the board is only dried. Practically no calcining takes place. As long as the board still contains free water, its temperature cannot exceed the boiling point of water. Once the board has passed halfway through furnace 15, the freely available moisture has decreased to about zero. If now the temperature of the board increases further, the calcining process starts up. In order to avoid too rapid a temperature rise, the temperature of the circulating air is kept lower in this part of the furnace 15. At the end of continuous furnace 15, the board has a temperature of 130° C. After that, the dried boards reach a belt conveyer 16, on which they are irrigated by means of an aspirating device 17. In this, the surface of the boards is completely covered as rapidly as possible with water, which can be accomplished by uniformly flooding it by means of flooding channels 18. At the same time, a vacuum chamber on the underside of the boards ensures that the water is aspirated as quickly as possible through the boards. Water has to be aspirated only until the underside of the board is moistened everywhere with water. The excess water aspirated is pumped into the industrial water tank 2.

Subsequently, the irrigated boards reach a press 19, where they are pressed to their final density and thickness and where their surface is calibrated. For example, boards having densities of 0.9 to 1.2 kg/L and transverse bending strengths of 6.0 to 10.0 N/mm$^2$ are achieved. Advisably, the underside of the press platten is equipped with a screen belt, which makes additional dewatering possible and prevents the board becoming liquid if the pressure build-up is too rapid. The boards are then transferred by a conveyer 20 to a setting segment 21. Consolidation with final conversion of the hemihydrate to the dihydrate takes place here. As a consequence of the preceding beta calcination process, this process takes only 1.5 to 2 hours without addition of any setting accelerators. The drier 22 is followed by equipment 23 for edging the finished boards longitudinally and transversely. The boards are then deposited on a stack 24.

I claim:

1. A method for the production of fibrous plaster boards comprising preparing a suspension from wet-digested fiber material and calcium sulfate dihydrate, dewatering the suspension to a residual moisture content of 30 to 40% while simultaneously forming the suspension into boards, recrystallizing the dihydrate by heating the boards in air and without pressure to convert the dihydrate to a beta form of a hemihydrate, and setting the boards by aspirating water through the boards by suction.

2. A method as in claim 1, wherein said heating comprises dry calcination at a board temperature of 100° to 170° C.

3. A method as in claim 2, wherein said board temperature is 115° to 140° C.

4. A method as in claim 1, wherein said aspirating comprises flooding the boards with a stoichiometric excess of water.

5. A method as in claim 4, wherein said stoichiometric excess is at least 2.5 times the stoichiometric amount of water required for the boards.

6. A method as in claim 1 further comprising calibrating the boards in a press after aspiration.

7. A method as in claim 6 further comprising dewatering the boards during calibration.

8. A method as in claim 7 further comprising consolidating the calibrated boards for final conversion of the hemihydrate to dihydrate.

* * * * *